Patented Sept. 3, 1946

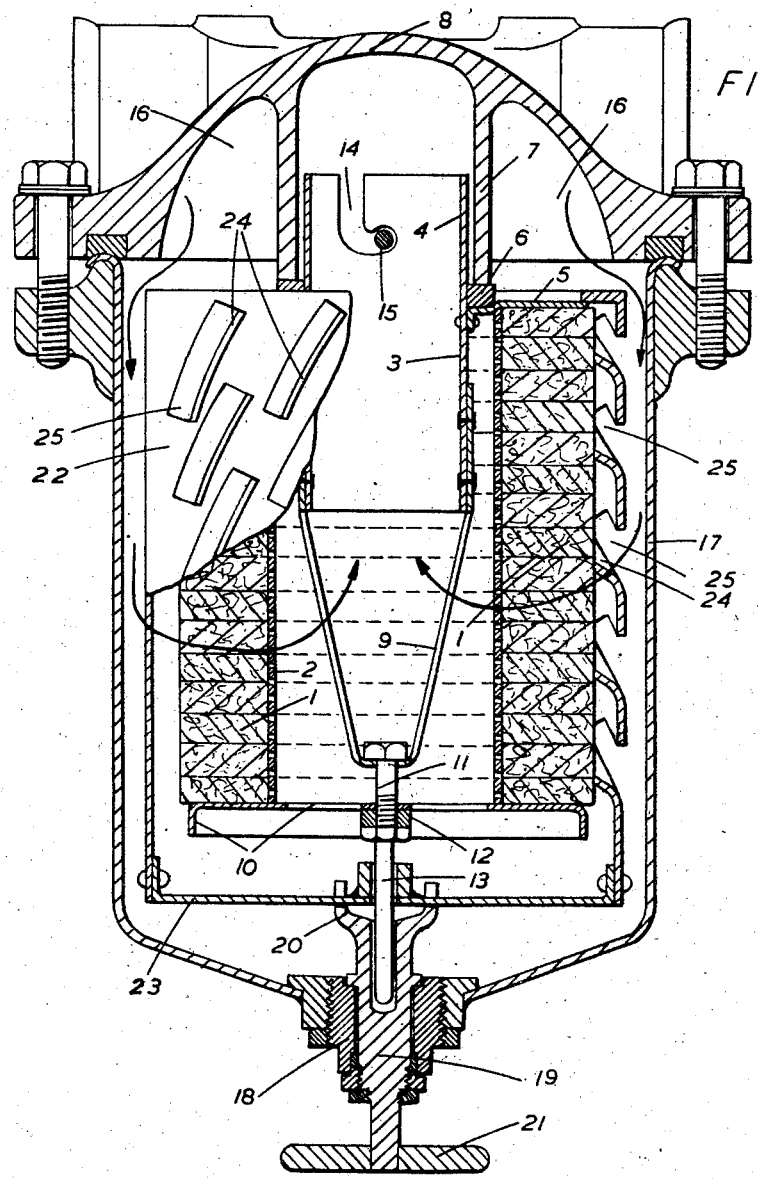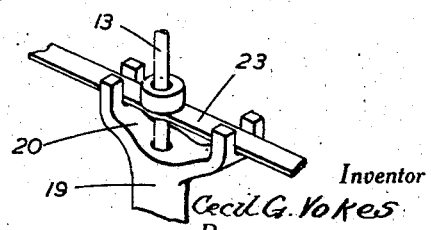

2,407,046

UNITED STATES PATENT OFFICE 2,407,046

READILY CLEANABLE FILTER

Cecil Gordon Vokes, London, England

Application March 15, 1944, Serial No. 526,571
In Great Britain January 27, 1943

6 Claims. (Cl. 210—167)

This invention provides a filter incorporating means for mechanical cleaning of the filter screen. Many materials used for filtering get obstructed by a shallow deposit on the "dirty" side long before the general body of material has become choked and provision is sometimes made for removing from a filter casing a unit including the screen so that the deposit can be removed and the unit replaced. It has also been proposed to use scraping means bearing resiliently against the dirty surface of a filter screen of circular section and relatively movable by rotation about the axis of the screen, from outside the filter casing and to provide for the sludge or deposit to be drawn off. The improved filter is of this latter kind and has a cage or like mounting which carries scraping means disposed about the circumference of the screen and is freely centered relatively to the screen so tending automatically to give a uniform scraping contact about the screen as rotation takes place.

Other parts of the invention are embodied in a typical form which will now be described with reference to the accompanying drawing. This form is primarily intended as an oil filter to be inserted in a by-pass leading straight back to the oil reservoir or sump and not supplying the bearings, to give rather fine filtration of a relatively small proportion of the circulating lubricating oil of an internal combustion engine. The parts of the invention for which a patent is desired are those delimited by the claims.

In the drawing:

Fig. 1 is a central sectional elevation, and

Fig. 2 is a detail to a larger scale.

The unit or element is built up of discs 1 of felt or other suitable material firmly mounted on a central perforated cylinder 2. End plates 5 and 10 are retained by securing centrally to plate 5 a tube section 4, substantially midway between the ends of said sleeve, as shown. A depression in plate 5 concentric with the tube section 4, receives a packing ring 6 which bears against the end of the outlet passage 7 of the head casting 8. The lower end portion 3 of tube 4 is attached to a spider 9 to which the second end cap 10 is secured by a bolt 11 extending centrally through cap 10 and a nut 12. The bolt is extended as an axial rod 13 of reduced diameter. The upper portion of tube 4 has two diametrically opposite bayonet slots at 14 to engage a cross bar 15 fitting holes in the walls 7 of the outlet passage of the filter casing header 8. The inlet passage 16 leads into the space surrounding the unit within the cylindrical casing 17 secured to the header. The nut 12 thus clamps the end caps 5 and 10 to the ends of cylinder 2. A bottom plug 18 has journaled coaxially within it a spindle 19 having an axial bore in which the rod 13 bears loosely. The spindle 19 has an upwardly projecting fork 20 and an external downwardly-projecting operating handle 21. Surrounding the felt discs is a rotatable cage 22 with a lower relatively narrow cross-member or bar 23 loosely engaged by the fork 20 (see Fig. 2). In the form shown the cage comprises a cylinder 22 freely centered about the unit, so that the scrapers (formed as shown by pieces 24 struck inwardly to form inclined slots 25 and disposed about the outside of its circumference) automatically tend to equalize their contact on the dirty (outer) side of the felt discs 1. The internal surfaces of the scrapers are made to fit with resilient pressure against the cylindrical outer surface of the assembled discs. The slight resilience of the discs may suffice or the scrapers may themselves be somewhat resilient or resiliently mounted in the cylinder or cage 22 and it will be apparent that the contact of scraping means disposed about the screen automatically tends to uniformity.

In operation the oil, passing through the slots 25 results in the dirt building up as a film on the surface of the material. On rotating the operating handle clockwise looking up along the rod 13 the dirt and sludge are loosened and scraped or sliced off and worked downwardly by the inclined scraper edges, so that they finally fall to the bottom of the casing where by removing the plug (or opening a tap) they can be withdrawn.

Clearly various other arrangements can be devised for rotating means resiliently bearing on a relatively small area and cleaning or scraping the external or internal surface of a cylindrical unit, with suitable sumps and plugs or taps for withdrawing the sludge.

I claim:

1. A filter comprising a casing, a hollow cylindrical filter element in said casing, a cage formed of resilient material in said casing, surrounding said element in spaced relation thereto, and having scraper blades struck inwardly from its surface to form scraper edges resiliently engaging the outer surface of said element, each edge forming a section of a helix about the common axis of said element and cage, and means operable externally of said casing to effect relative rotation of said cage and element.

2. In a filter, a casing, a hollow cylindrical filtering element fixedly mounted in said casing, a cage formed of resilient-material in said casing surrounding said element in spaced relation thereto and substantially axially coextensive therewith, said cage having scraper blades symmetrically mounted about said cage and extending inwardly therefrom, each said blade having an edge extending helically of and resiliently engaging said element, means mounting said cage for axial rotation about said element and for limited translation transversely to said element, whereby the resiliency of said blades maintains said cage substantially coaxial with said element, and means operable from the exterior of said casing for rotating said cage.

3. In a filter, a casing, a hollow cylindrical filter element fixed in said casing, a cylindrical cage formed of resilient material and mounted in said casing for rotation externally about and coaxially with said element in radially spaced relation thereto, said cage having an axial dimension not less than that of said element and having a plurality of integral blades extending inwardly from its surface to form scraper edges each resiliently engaging the outer surface of said element, each said edge being substantially in the form of a portion of a helix extending coaxially of said cage said edges overlapping axially of said cage, whereby, on rotation of said cage, said edges act to clean the entire external filtering surface of said element, and means engaging said cage and operable exteriorly of said casing, to rotate said cage relatively to said element.

4. In a filter, a casing, a hollow filter comprising a foraminous cylinder, a sleeve-like filter element surrounding and fitting said cylinder to form a cylindrical outer surface, upper and lower plates, means securing said plates together to engage the ends of said cylinder and clamp said element therebetween, said means comprising a tube section secured centrally and intermediate its ends to said upper plate, a spider secured to the lower end of said section, bolt and nut means extending axially of said cylinder and element and connecting said spider and lower plate, and a releasable connection between the upper end of said tube section and said casing a cage formed of resilient material, surrounding said filter in radially spaced relation thereto, and having blades struck inwardly therefrom, each blade forming an edge resiliently engaging said element, said cage including an inward flange resting on said upper plate to thereby support said cage and means engaging said cage and operable exteriorly of said casing to rotate said cage relatively to said element.

5. A filter comprising a casing, a hollow cylindrical filter element secured in said casing, and including a top plate, a cage formed of resilient material in said casing surrounding and substantially axially coextensive with said element in spaced relation thereto, the upper end of said cage being flanged inwardly to rest loosely on said top plate, said cage having inwardly-extending resilient scraper blades forming scraper edges in the contact with the outer surface of said element, each edge forming a section of a helix about the axis of said element, a spindle journalled in the lower wall of said casing coaxially with said element and having a forked upper end and a handle at its lower end exteriorly of said casing, and a member secured diametrically of said cage at its lower end and resting loosely in said fork, said cage being maintained coaxial of said element by the resiliency of said blades.

6. In a filter, a closed casing having a central axis, the upper end of said casing being closed by a header having a cylindrical wall coaxial of said axis to form a chamber, an outlet port in said header in communication with said chamber, a hollow cylindrical filtering element in said casing coaxial with said axis and including an upper plate across one end of said element, a tube section extending through and fixed to said first plate coaxially with said element, said tube having an upper portion having bayonet slot therein and adapted to slidably fit said chamber and to engage lugs therein to hold said upper plate in fluid-tight engagement with the lower edge of said chamber, a second plate extending over and closing the lower end of said element, means connecting said lower plate and tube section to clamp said element between said plates, a rod projecting downwardly from said lower plate along said axis, a spindle journaled in the lower end of said casing for rotation on the axis of said element and having an axial bore loosely receiving said rod and also having a forked end within said casing, a cage coaxial of and surrounding said element, said cage having inwardly extending helically-arranged blades providing scraper edges resiliently engaging said element, said cage having an upper flange resting loosely on said upper plate and a bar extending diametrically across its lower end, said bar being loosely journaled on said rod and engaging said fork, said spindle being rotatable exteriorly of said casing to thereby rotate said cage, the resiliency of said blades acting to maintain said cage substantially coaxial with said element and all said scraper edges in contact therewith, and an inlet port in said header in communiaction with said casing exteriorly of said element.

CECIL GORDON VOKES.